US011341453B2

(12) United States Patent
Funderburg et al.

(10) Patent No.: US 11,341,453 B2
(45) Date of Patent: May 24, 2022

(54) DYNAMIC NEGATIVE PERPETUAL INVENTORY RESOLUTION SYSTEM

(71) Applicant: Walmart Apollo, LLC, Bentonville, AR (US)

(72) Inventors: Laura Funderburg, Bentonville, AR (US); Ed VanWilpe, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/366,203

(22) Filed: Mar. 27, 2019

(65) Prior Publication Data

US 2019/0303845 A1    Oct. 3, 2019

Related U.S. Application Data

(60) Provisional application No. 62/651,700, filed on Apr. 2, 2018.

(51) Int. Cl.
*G06Q 10/08*   (2012.01)
*G06Q 30/04*   (2012.01)

(52) U.S. Cl.
CPC ......... *G06Q 10/087* (2013.01); *G06Q 30/04* (2013.01)

(58) Field of Classification Search
CPC ........ G06Q 10/00; G06Q 30/00; G06K 17/00; G06K 7/00; G06K 9/62
USPC ....... 705/22, 28, 14.63, 26.81; 235/385, 383
See application file for complete search history.

(56) References Cited

U.S. PATENT DOCUMENTS

| | | | | |
|---|---|---|---|---|
| 7,711,612 B1 * | 5/2010 | Farias | ................... | G06Q 10/06 705/28 |
| 8,386,323 B1 * | 2/2013 | Chenault | .............. | G06Q 10/087 705/22 |
| 2001/0049690 A1 * | 12/2001 | McConnell | .......... | G07G 1/0054 |
| 2003/0216969 A1 * | 11/2003 | Bauer | ...................... | H01Q 7/00 705/22 |

(Continued)

FOREIGN PATENT DOCUMENTS

| | | |
|---|---|---|
| WO | 0167356 A1 | 9/2001 |
| WO | 2015184286 A1 | 12/2015 |
| WO | 2016109251 A1 | 7/2016 |

OTHER PUBLICATIONS

Young, Lee W., "International Search Report", International Application No. PCT/US19/24279, dated Jun. 14, 2019, 2 pages.

(Continued)

*Primary Examiner* — Olusegun Goyea

(57) ABSTRACT

Examples provide a system for dynamically resolving negative PI. A negative reset component resets a negative PI value in an inventory record for a selected item to zero if there is an absence of activity associated with instances of the item. There is an absence of activity if there are no shipments, transactions, or items scans associated with instances of the item during a threshold time-period. An analysis component analyzes real-time data associated with the selected item, including invoice data, transaction data, and sensor data to determine whether there is activity associated with an item during the threshold time-period. A receiving component resets a negative PI value associated with an identified item to a positive PI value representing the number of instances of the item received during the threshold time-period.

20 Claims, 10 Drawing Sheets

(56) References Cited

U.S. PATENT DOCUMENTS

| | | | |
|---|---|---|---|
| 2006/0293968 A1* | 12/2006 | Brice | G06Q 30/06 705/14.63 |
| 2007/0112651 A1* | 5/2007 | Swan | G06Q 10/087 705/28 |
| 2010/0217678 A1* | 8/2010 | Goncalves | G06Q 20/203 705/22 |
| 2013/0144757 A1 | 6/2013 | Bauer et al. | |
| 2018/0005174 A1* | 1/2018 | Dixon | G06Q 30/0202 |

OTHER PUBLICATIONS

Young, Lee W., "Written Opinion", International Application No. PCT/US19/24279, dated Jun. 14, 2019, 6 pages.

Hardgrave, Bill C., et al., "Does RFID improve inventory accuracy? A preliminary analysis", International Journal of RF Technologies: Research and Applications, vol. 1, No. 1, Mar. 2009, pp. 44-56.

* cited by examiner

*FIG. 10*

Data collected over a week — 1000

| | 1002<br>Total replenishable store/item negative | 1026<br>New Neg Reset logic | 1028<br>New Receiving logic | | |
|---|---|---|---|---|---|
| 1006 | 146,057.00 | 27,795.00 | 33,040.00 | | |
| 1008 | 209,879.00 | 42,778.00 | 47,662.00 | | |
| 1010 | 196,404.00 | 34,253.00 | 39,985.00 | | Total store items |
| 1012 | 187,861.00 | 11,985.00 | 13,095.00 | | 440,000.00 |
| 1014 | 164,027.00 | 13,031.00 | 15,289.00 | | 0.007% |
| 1016 | 148,065.00 | 29,229.00 | 35,001.00 | | |
| 1018 | 133,938.00 | 22,175.00 | 26,426.00 | | |
| 1020 Total | 1,186,231.00 | 181,246.00 | 210,498.00 | | |
| Average | 169,461.57 | 25,892.29 | 30,071.14 | | |
| 1022 | | | | | |
| | | Additional | | 4,178.86 | |
| | | % to total negative | | 17.7% | |

DYNAMIC NEGATIVE PERPETUAL INVENTORY RESOLUTION SYSTEM

BACKGROUND

Perpetual inventory (PI), also referred to as system inventory, typically includes a record of the number of instances of each item in a store's inventory. The PI value for an item is updated to reflect sales or delivery of instances of each item. It is important to keep the PI value as accurate as possible, as the PI can be utilized to inform ordering/invoicing, restocking shelves, storage space allocation, and other operational decisions. However, PI for an item may become overstated due to inaccurate invoice data, damage or breakage of items, loss/shrink, or error leading to the PI value indicating a greater number of instances of the item than is present on-hand. An understated PI can occur due to inaccurate invoice data or item counts during sales or inventory, failure to scan items correctly, etc. A negative PI can occur where the number of instances of the item sold is greater than the understated PI value. An understated or negative PI value may lead to premature ordering of additional instances of an item and/or ordering excessive quantities of the item which can increase item transportation and storage costs, reduce item ordering efficiency, and result in unnecessary item restocking tasks for users.

SUMMARY

Some examples provide a system for dynamic negative perpetual inventory (PI) adjustment. The system includes a memory; at least one processor communicatively coupled to the memory; a data storage device storing inventory data associated with a plurality of items in an inventory associated with an item selection area; and a plurality of sensor devices associated with the item selection area, the plurality of sensor devices generating sensor data associated with at least one item physically located within the item selection area, including item scan data associated with the at least one item. A receiving component analyzes invoice data associated with a set of items received by the item selection area within the threshold time-period. The receiving component identifies the number of instances of the item received at the item selection area within the threshold time-period based on the analysis. An item identification component analyzes the sensor data, the inventory data, and transaction data associated with the plurality of items using a set of reset rules. The item identification component identifies a selected item in the plurality of items having a negative PI value and an absence of activity for a threshold time-period based on a result of the analysis. The activity includes a transaction associated with at least one instance of the item, a receipt of scan data identifying at least one instance of the item physically present within the item selection area from at least one scan device, and/or identification of at least one instance of the item received at the item selection area within the predetermined time-period based on the invoice data. If the first value is a negative PI value and activity associated with at least one instance of the item does not occur within the predetermined time-period, a negative reset component resets a first value in an inventory record associated with an identified item to zero once per day. A receiving component resets the first value associated with the identified item to a second value representing the number of instances of the item received at the item selection area during the predetermined time-period if the PI value for the item is a negative value and at least one instance of the item received at the item selection area is received within the predetermined time-period.

Other examples provide a computer-implemented method for dynamic negative perpetual inventory adjustment. An item identification component analyzes sensor data obtained from a plurality of sensor devices associated with an item selection area and item data associated with a plurality of items in inventory of the item selection area using a set of reset rules. If the item identification component identifies an item in the plurality of items having a negative PI value and an absence of activity for a threshold time-period based on the analysis, a negative reset component updates the negative PI value within an inventory record associated with the identified item to zero. If a set of items including at least one instance of the identified item is unreceived at the item selection area during the threshold time-period, a receiving component updates the negative PI value to a positive value representing a number of instances of the identified item received by the item selection area during the threshold time-period.

Still other examples provide a system for dynamic perpetual inventory (PI) adjustment. The system includes a memory; at least one processor communicatively coupled to the memory; and a set of can devices generating sensor data associated with a set of items in an item selection area. An item identification component analyzes the scan data, inventory data, and transaction data associated with a plurality of items in inventory of the item selection area using a set of reset rules and identifies an item in the plurality of items having a negative PI value and an absence of activity for a threshold time-period based on the analysis. A receiving component analyzes invoice data associated with a set of items received by the item selection area within the threshold time-period to determine the number of instances of the item received at the item selection area within the threshold time-period. A receiving component resets the negative PI value within an inventory record associated with the identified item to a value representing the number of instances of the identified item received by the item selection area within the threshold time-period. The negative reset component resets the negative PI value to zero on condition the number of instances of the identified item received by the item selection area within the threshold time-period is zero.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10 is an exemplary table illustrating negative PI resolution component changes to PI during a one-week time-period.

Corresponding reference characters indicate corresponding parts throughout the drawings.

DETAILED DESCRIPTION

Figure 1:
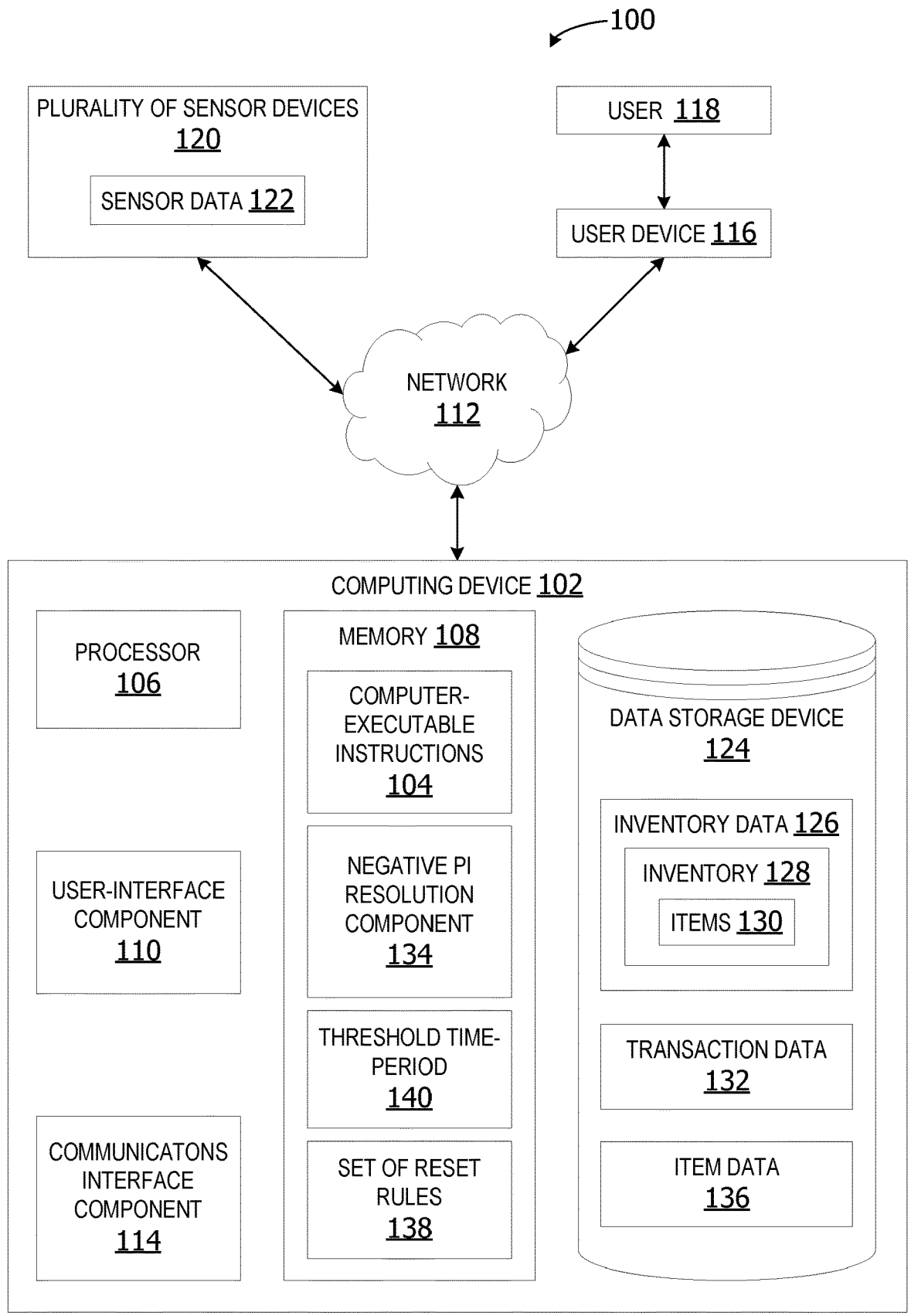
FIG. 1 is an exemplary block diagram illustrating a system for dynamic negative perpetual inventory (PI) management.

Referring to the figures, some examples of the system enable dynamic resolution of negative perpetual inventory (PI) based on real-time context data associated with a plurality of items within an item selection area. In some examples, a negative reset component autonomously resets a negative PI value in an inventory record associated with a selected item to zero on a regular basis, such as, but not limited to, every twenty-four hours or thirty-six hours. The PI value is changed to zero if there is an absence of activity associated with at least one instance of the item occurs within the predetermined time-period.

The term "activity" when associated with an item refers to any measurable or detectable activity, actions, movement, or other data indicating presence or absence of an item in physical inventory. Item activity can include a transaction (transaction data) associated with one or more instances of the item, receipt (receiving) of one or more physical instances of the item at the item selection area, and/or a scanner device scanning one or more instances of the item in physical, on-hand inventory within the item selection area. A transaction can refer to purchase or return of an item. Receipt of an item can refer to receiving a shipment of an item or receiving one or more of the item as a return. Scanning an item can refer to scanning a barcode or a quick response (QR) code on the item, using optical character recognition (OCR) or other image analysis to read labels or text on a tag, capturing an image of the item in the store, and/or any other type of scanning of data associated with the item.

Dynamic adjustment of the PI values in these examples enables automatic and timely resolution of negative PI based on real-time context data associated with item scans, item purchases, item returns, restocking items, item deliveries, etc.

Other examples provide a receiving component that resets the negative PI value associated with a selected item to an updated positive PI value representing the number of instances of the item received at the item selection area during a predetermined time-period, such as, but not limited to, a twenty-four-hour time-period or a forty-eight-hour time-period. This enables efficient and cost-effective removal of negative PI while providing a more accurate and reliable system PI value for a selected item which more closely reflects actual numbers of instances of the item in physical on-hand inventory.

In other examples, a negative PI resolution component running on a computing device detects and eliminates negative PI values associated with items in inventory, thereby improving functioning of the underlying computing device. This negative PI resolution component further generates more accurate PI records for items in inventory without human intervention based on analysis of scan data, image capture data, inventory data, invoicing/truck delivery data, and other real-time context data. This provides more accurate PI values while reducing time and human resources expended on updating inventory records. In this manner, the system can further improve item restocking and ordering accuracy, reduce inventory and ordering error rate, and improve reliability of PI data.

Referring again to FIG. 1, an exemplary block diagram illustrates a system 100 for dynamic negative perpetual inventory (PI) management. In the example of FIG. 1, the computing device 102 represents any device executing computer-executable instructions 104 (e.g., as application programs, operating system functionality, or both) to implement the operations and functionality associated with the computing device 102. The computing device 102 can include a mobile computing device or any other portable device. In some examples, the mobile computing device includes a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 can also include a user interface component 110.

The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 7, FIG. 8 and FIG. 9).

The computing device 102 further has one or more computer-readable media such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. For example, the user can input commands or manipulate data by moving the computing device 102 in one or more ways/directions.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to a user device associated with a user 118 and/or a plurality of sensor devices 120, can occur using any protocol or mechanism over any wired or wireless connection. In some examples, the communications interface component 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface component.

The plurality of sensor devices 120 generates sensor data 122 associated with a set of one or more items in an item selection area. The plurality of sensor devices 120 can include scanner devices, image capture devices, or any other type of sensor devices. A scanner device can include a barcode scanner, a quick response (QR) code reader, a radio frequency identification (RFID) tag reader, a matrix barcode reader, a universal product code (UPC) reader, or any other type of scanner device. A scanner device can be a hand-held scanner device, a mounted scanner device, or an autonomous robotic scanner device.

The system 100 can optionally include a data storage device 124 for storing data, such as, but not limited to inventory data 126 including inventory data associated with one or more items 130 in inventory 128 associated with an item selection area. The data storage device 124 can also store transaction data 132 describing transactions associated with the one or more items 130. A transaction can include purchase of an instance of an item and/or return of an instance of an item.

An instance of a selected item "A" is a unit of the item. For example, if the selected item is a six ounce can of a brand "X" tomato paste, two of the six-ounce sized cans of the brand "X" tomato paste is identified as two instances of the brand "X" six-ounce can of the tomato paste item. As used herein, the term item can refer to a single instance of an identified item.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database.

The data storage device 124 in this example is included within the computing device 102 or associated with the computing device 102. In other examples, the data storage device 124 is a remote data storage accessed by the computing device via the network 112, such as a remote data storage device, a data storage in a remote data center, or a cloud storage.

The memory 108 in some examples stores one or more computer-executable components. Exemplary components include a negative PI resolution component 134. The negative PI resolution component 134 analyzes the sensor data 122 and item data 136 describing attributes of the plurality of items in inventory 128 of the item selection area using a set of reset rules 138. The set of reset rules 138 is a set of one or more rules for determining when to autonomously reset PI to zero or reset the PI from a negative value to a positive value based on analysis of transaction data, sensor data, seasonality (time of year) or other factors/criteria.

The negative PI resolution component 134 identifies an item in the plurality of items having a negative PI value. A negative PI value indicates a value of less than zero in inventory. For example, a negative PI value for the can of tomato paste can be a value of negative one (−1) indicating less than zero instances of the tomato paste in inventory. However, there cannot be less than zero cans of the tomato paste physically present. There may be no cans of tomato paste, as well as one or more cans of tomato paste in on-hand inventory. Therefore, the negative PI resolution component 134 identifies the negative PI value as an erroneous and understated PI value for the identified tomato paste item in this example.

The negative PI resolution component 134 identifies an item in the one or more items 130 having a negative PI value in the inventory record for that item and an absence of activity for a threshold time-period 140. In some examples, the negative PI resolution component 134 analyzes the inventory data 126, the sensor data 122, the item data 136, the transaction data 132, and/or invoice data, including delivery data, to identify items having a negative PI value and no activity associated with instances of the item.

The negative PI resolution component 134 updates the negative PI value for the identified item from the negative value to zero if there is an absence of activity associated with instances of the item for the threshold time-period 140. The threshold time-period 140 can be any user-defined or configurable time-period. In some examples, the threshold time-period 140 is a twenty-four-hour (daily) time-period. In other examples, the threshold time-period 140 is a thirty-six-hour time-period, a forty-eight-hour time-period, a twelve-hour time-period, or any other user-defined amount of time.

If one or more instances of the identified item is received at the item selection area within the threshold time-period, the negative PI resolution component 134 resets the PI from the negative value to a positive value representing the number of instances of the identified item received by the item selection area during the threshold time-period.

In some non-limiting examples, if a scan data associated with one or more instances of the selected item is received indicating a presence of additional instances of the item in on-hand inventory, the negative PI resolution component updates the negative PI to a value representing the number of instances of the item scanned and physically present within the item selection area.

The computing device 102 operates in an unconventional manner by executing the negative PI resolution component 134 to continuously monitor inventory associated with a plurality of items and update negative PI values associated with items in inventory without human intervention. In this manner, the computing device 102 is used in an unconventional way and allows for more accurate PI values for hundreds or even thousands of items within a system inventory while preventing and/or correcting understated PI for those items as they occur in real-time.

Figure 2:
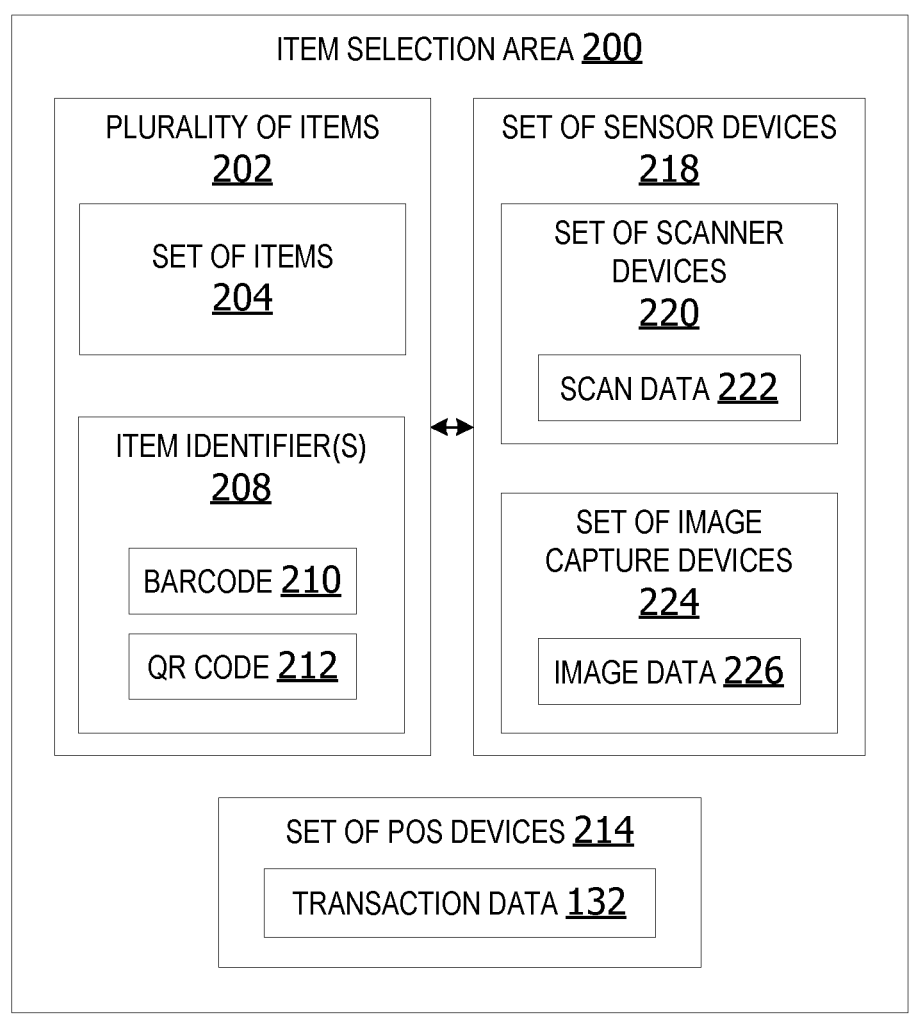
FIG. 2 is an exemplary block diagram illustrating an item selection area including a plurality of items.

FIG. 2 is an exemplary block diagram illustrating an item selection area 200 including a plurality of items 202. The item selection area 200 is a location storing and/or displaying the plurality of items 202 for sale or purchase. The item selection area 200 can be a retail location, such as a store. In other examples, the item selection area can include a distribution center, a warehouse, a garden center, an outdoor market, a grocery store, a hardware store, or any other type of location including the plurality of items 202.

The plurality of items 202 can include any type of items, such as, but not limited to, comestibles, tools, garden supplies, pet supplies, sports equipment, clothing, shoes, cleaning supplies, or any other type of items. Comestibles includes any type of edible items, such as, but not limited to, diary items, bakery items, frozen foods, can goods, dry goods, produce, etc. In some examples, a set of one or more items 204 in the plurality of items 202 has a negative PI value in system inventory.

An item in the set of items 204 can be any type of item, such as, but not limited to, an item of produce, tool, bag of pet food, clothing item, shoes, dish, toy, furniture, automotive part or any other product in a store or other retail environment. An item in the set of items 204 can include a single item or packaging containing multiple items in a set or a kit containing multiple pieces/parts for assembly into an item. An item in the set of items 204 can also be one or more pieces or parts of a larger set, collection or kit.

The plurality of items 202 can include item identifier(s) 208. An item identifier in the one or more item identifier(s) 208 is a marking, code, tag or other identifier on the item. An identifier can be a barcode 210, such as a UPC code, a matrix barcode, etc. The item identifier(s) 208 can include a QR code. The item identifier, in other examples, includes an RFID tag, a watermark, a digital mark (Digi-marc), a text label, or any other identifier.

A set of one or more point-of-sale (POS) devices 214 generates transaction data 132 associated with the plurality of items 202. The transaction data 132 is data associated with the purchase or return of instances of items from the plurality of items 202.

A set of one or more sensor devices 218 includes sensor devices, such as, but not limited to, the plurality of sensor devices 120 in FIG. 1. The set of sensor devices 218 can include a set of scanner devices 220 generating scan data 222. The set of scanner devices 220 can include one or more hand-held scanner devices, one or more robotic scanner devices, and/or one or more scanner devices mounted to a wall, pillar, shelf, ceiling, counter or other object.

The scan data 222 is data generated by a scanner device scanning an item identifier in the one or more item identifier(s) 208. The scan data 222 can include UPC code data, matrix barcode data, QR code data, RFID tag data, or any other item data provided by the item identifier(s) 208.

The set of sensor devices 218 can include a set of one or more image capture devices 224 generating image data 226 associated with one or more items in the plurality of items 202. The set of image capture devices 224 can include one or more video cameras, one or more still image cameras, one or more infrared (IR) cameras, or any other type of image capture devices. The image data 226 can include images of one or more portions of an item. The image data 226 can include an image of an item identifier, an image of an item packaging, an image of a portion of the item, etc.

Figure 3:
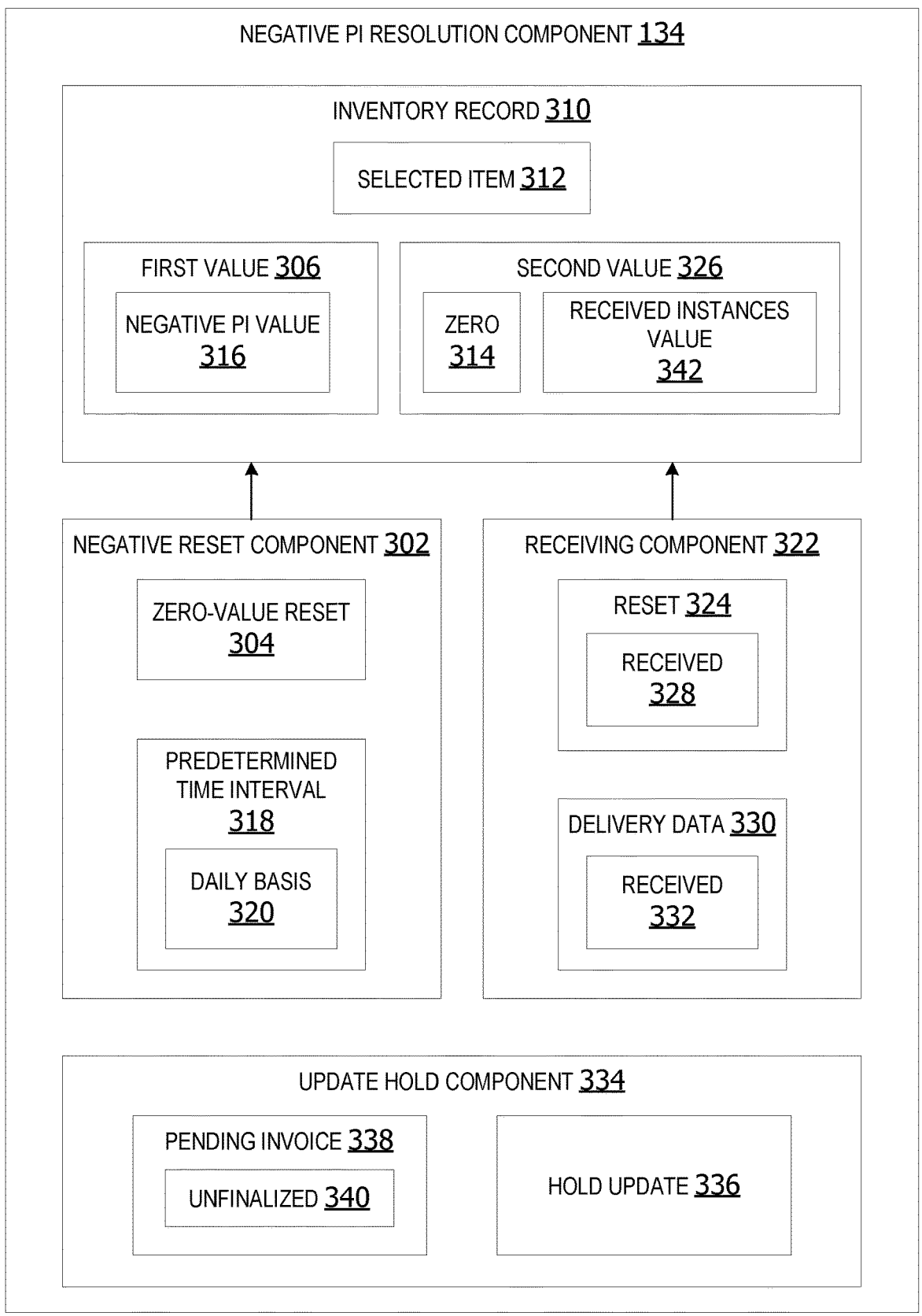
FIG. 3 is an exemplary block diagram illustrating a negative PI resolution component.

FIG. 3 is an exemplary block diagram illustrating a negative PI resolution component 134. The negative PI resolution component 134 is a component for resolving negative PI values for items. The negative PI resolution component 134 in some examples includes a negative reset component 302.

The negative reset component 302 performs a zero-value reset 304 on a first value 306 in an inventory record 310 associated with a selected item 312 to zero 314 on a predetermined time interval 318. The predetermined time interval 318 can be any user-defined amount of time, such as, but not limited to, a twelve-hour time interval, a twenty-four-hour time interval (daily basis 320), a thirty-hour interval or any other time interval. If the first value 306 is a negative PI value 316 and there is an absence of activity detected associated with at least one instance of the item for a predetermined time-period, the negative reset component 302 changes the negative PI value 316 to zero 314.

In some non-limiting examples, the negative reset component 302 analyzes image data generated by one or more image capture devices to identify the number of instances of the item in on-hand inventory. The image data can be data generated by one or more image capture devices, such as the set of image capture devices 224 in FIG. 2. The negative reset component 302 resets the negative PI value 316 associated with the selected item 312 to a value representing the number of instances of the selected item 312 detected via the analysis of the image data.

A receiving component 322 in other examples performs a reset 324 updating the first value 306 to a second value 326 representing a number of instances of the item received 328 at the item selection area during the predetermined time interval 318 on condition the first value 306 is a negative PI value 316 and delivery data 330 identifies at least one instance of the item received 332 at the item selection area within the predetermined time-period. The receiving component 322 re-sets the negative PI value 316 to a received instances value 342 representing the number of instances of the selected item 312 received.

In some examples, the receiving component 322 analyzes invoice data associated with a set of items received by the item selection area within the predetermined time interval 318 to determine the received instances value 342 of the item received at the item selection area. In other examples, the receiving component 322 resets the negative PI value 316 to a value representing the number of instances of the identified item received by the item selection area within a threshold time-period (time range).

An update hold component 334 in other examples performs a hold update 336 preventing the negative reset component 302 and/or the receiving component 322 if pending invoice 338 is un-finalized 340. If the pending invoice 338 is finalized, the update hold component 334 releases the negative reset component 302 and/or the receiving component 322 for updating/re-setting the PI value from the negative value to zero or to the received instances value 342.

Figure 4:
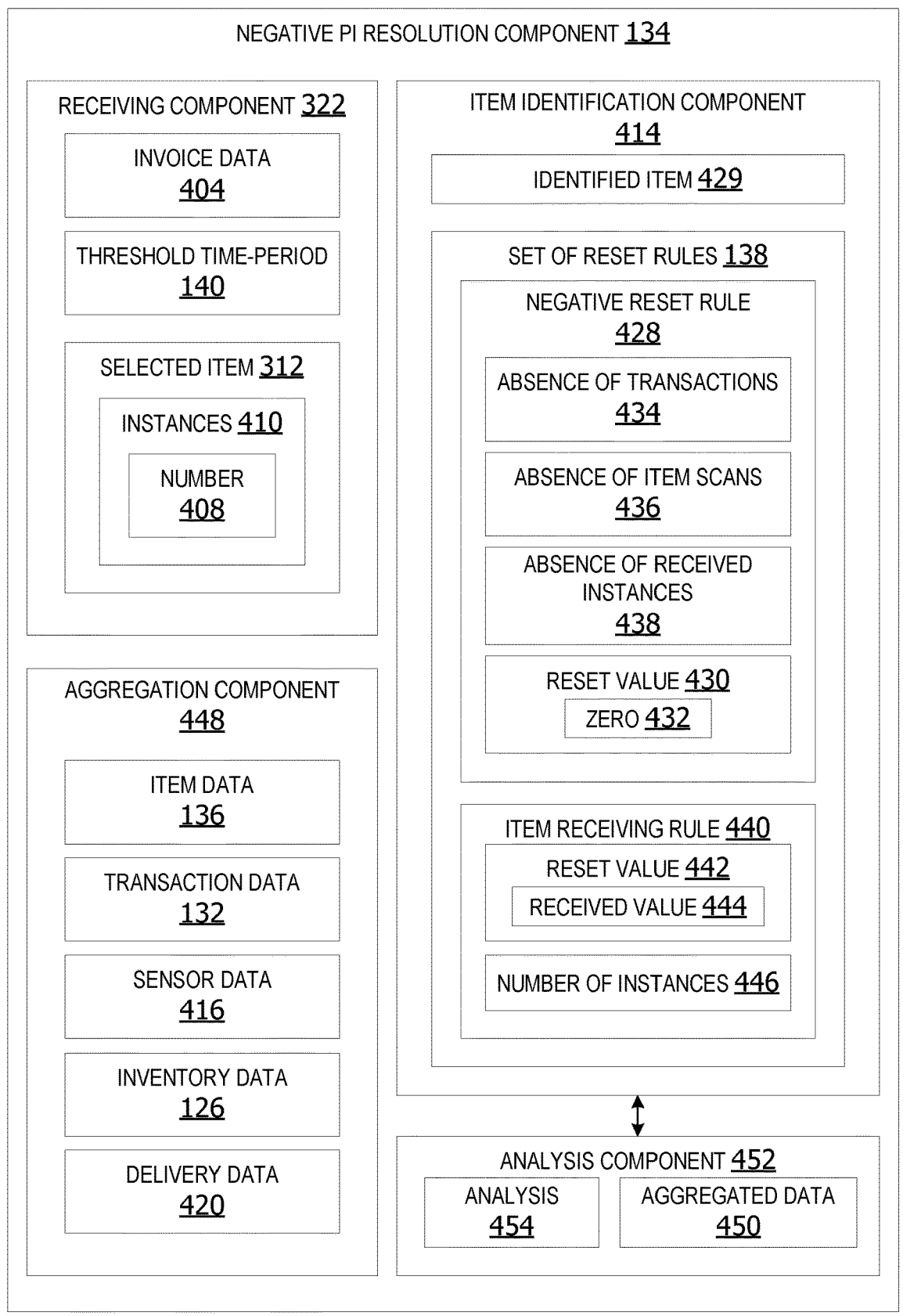
FIG. 4 is an exemplary block diagram illustrating a negative PI resolution component analyzing aggregated data.

FIG. 4 is an exemplary block diagram illustrating a negative PI resolution component 134 analyzing aggregated data. The negative PI resolution component 134 is a component for resolving negative PI values for items in system inventory.

The receiving component 322 analyzes invoice data 404 associated with a set of items received by the item selection area within the threshold time-period 140 to identify the number 408 of instances 410 of the selected item 312 received at the item selection area.

An item identification component 414 analyzes the sensor data 122, the inventory data 126, the delivery data 420, item data 136, and/or and transaction data 132 associated with the plurality of items using a set of reset rules 138 to identify an item in the plurality of items having a negative PI value and an absence of activity associated with the identified item 429 for the threshold time-period 140 based on the results of the analysis. The activity associated with the identified item can include a transaction associated with at least one instance of the item, a receipt of scan data identifying at least one instance of the item physically present within the item selection area from at least one scan device, and/or an identification of at least one instance of the item received at the item selection area within the predetermined time-period based on the invoice data 404.

The set of reset rules 138 in some examples includes a negative reset rule 428. The negative reset rule 428 specifies resetting a negative PI reset value 430 of zero 432 if there is an absence of transactions 434 associated with at least one instance of the identified item 429 during the threshold time-period 140, an absence of item scans 436 associated with instances of the identified item 429 during the threshold time-period 140, and an absence of received instances 438 of the item received at the item selection area within the threshold time-period 140. In other words, the negative value for the item's PI is increased or set to the higher value of zero.

The set of reset rules 138 in other examples includes an item receiving rule 440. The item receiving rule 440 specifies a reset value 442 for resetting a negative PI value associated with an item to a received value 444 representing the number of instances 446 of the item received at the item selection area during a predetermined time-period on condition a PI value for the item is a negative value and at least one instance of the item is received within the predetermined time-period.

An aggregation component 448 aggregates the item data 136, the transaction data 132, the inventory data 126, the delivery data 420, and/or the sensor data 122 into aggregated data 450. The aggregated data 450 can be stored in a database, such as, but not limited to, the database 600 in FIG. 6 below.

The negative PI resolution component 134 can include an analysis component 452. The analysis component 452 performs an analysis 454 on the aggregated data 450 using the set of reset rules 138 to monitor PI values and identify negative (understated) PI values associated with one or more items.

Figure 5:
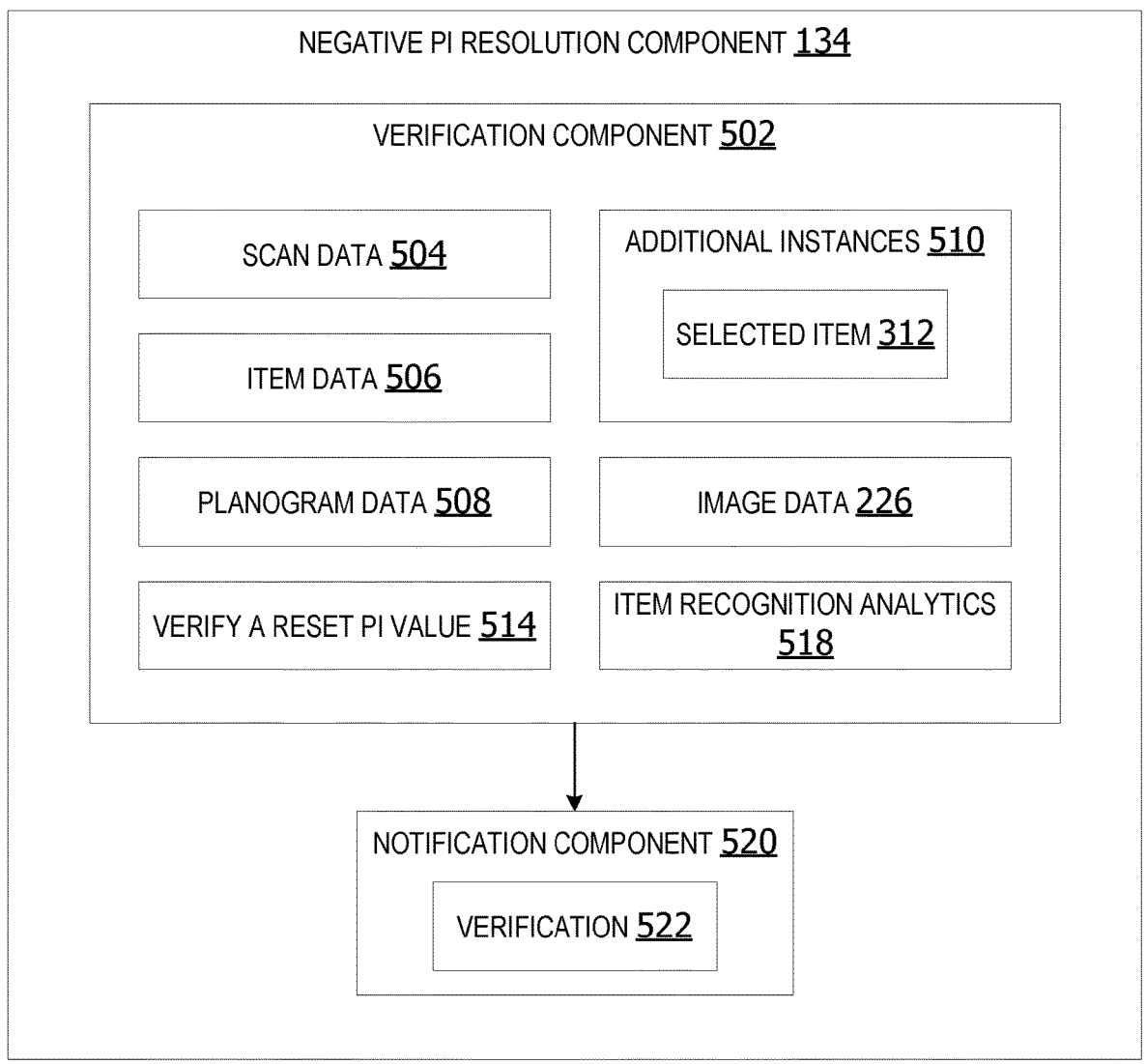
FIG. 5 is an exemplary block diagram illustrating a negative PI resolution component including a verification component.

FIG. 5 is an exemplary block diagram illustrating a negative PI resolution component 134 including a verification component 502. The negative PI resolution component 134 is a component for resolving negative PI values for items.

The verification component 502 analyzes the scan data generated by one or more scanner devices, item data associated with one or more items in the plurality of items in inventory, and planogram data 508 describing a layout of items and assigned display locations associated with items in inventory of an item display area. The verification component 502 analyzes the aggregated data to detect a presence of one or more additional instances 510 of the selected item 312 within the item selection area which are not reflected in the negative PI value. The verification component 502 determines whether to verify a reset PI value 514 based on the analysis of the aggregated data. If no additional instances 510 of the item are detected, the verification component 502 verifies the reset (updated) PI value.

In other examples, the verification component 502 analyzes image data 516 generated by a set of image capture devices using item recognition analytics 518 to detect a presence of any additional instances 510 of the selected item 312 within the item selection area. The verification component 502 verifies resetting the negative PI value to the number of instances of the identified item received during the threshold time-period on condition additional instances 510 of the identified item are undetected based on the analysis of the image data 226.

In this example, the image data 226 is separate from the scan data. In other examples, scan data can include image data 226.

In some non-limiting examples, a notification component 520 outputs a verification 522 notification to a user via a user interface. In other examples, the notification component 520 transmits the verification 522 to a user device via a network, such as the network 112 in FIG. 1.

Figure 6:
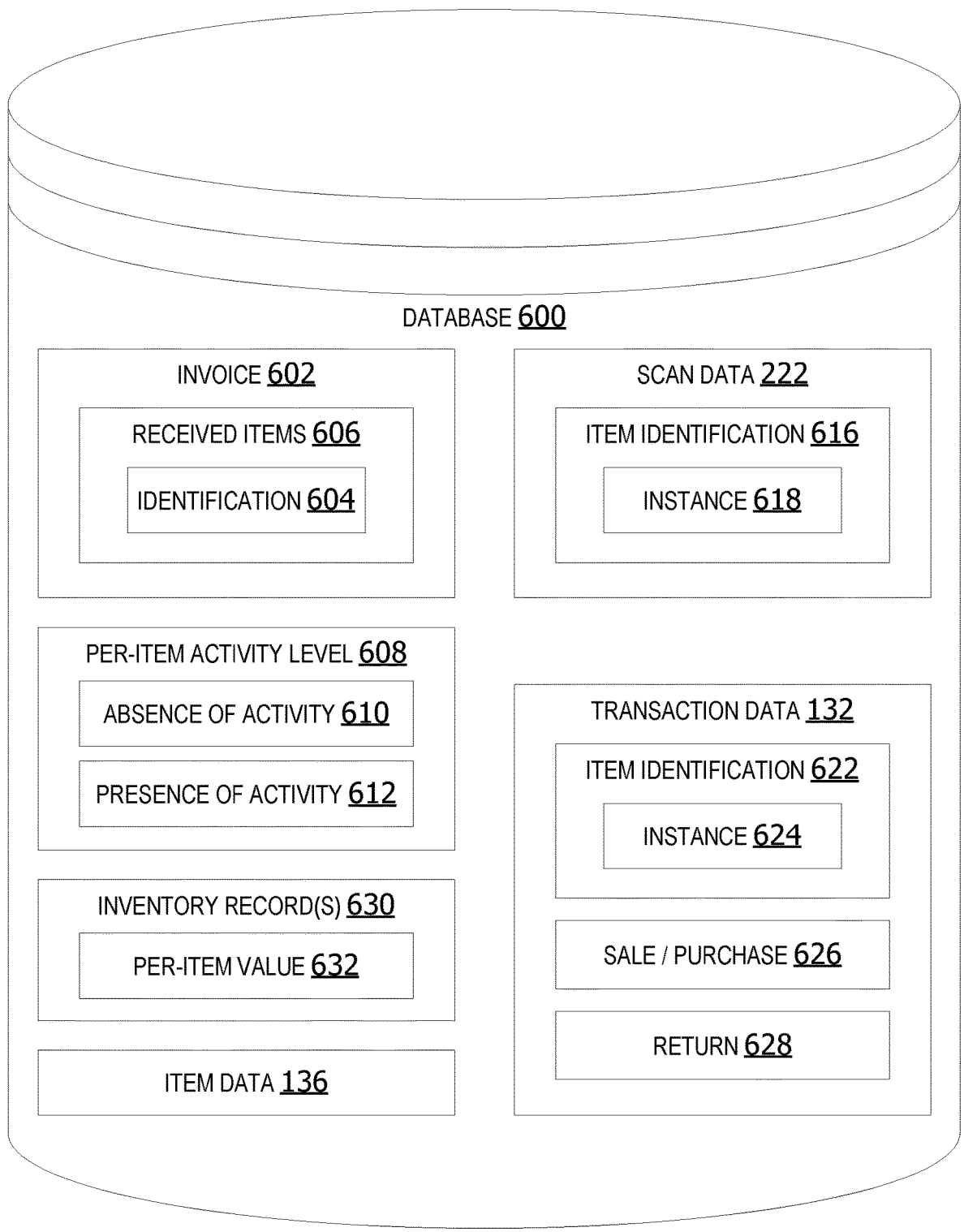
FIG. 6 is an exemplary block diagram illustrating a database storing data for performing PI management.

FIG. 6 is an exemplary block diagram illustrating a database 600 storing data for performing PI management. The database 600 stores data associated with one or more items. The database 600 can be located on a data store, such as, but not limited to, the data storage device 124 in FIG. 1.

The database 600 can include an invoice 602 including an identification 604 of received items 606 delivered to the item selection area. The database 600 can also include a per-item activity level 608 identifying an absence of activity 610 associated with an item or a presence of activity 612 associated with an item. The activity including transactions, scans, and/or deliveries of items (received items). The presence of activity 612 refers to detected or detectable activity.

Scan data 222 is data generated by one or more scanner devices. The scan data 222 can include an item identification 616 associated with each instance 618 of an item. Transaction data 132 can include an item identification 622 for each instance 624 associated with a sale/purchase 626 of an instance of an item and/or a return 628 of one or more instances of the item.

Inventory record(s) 630 is a record for each item including a PI value for the instances of the item. The per-item value 632 can be a negative PI value, a positive PI value, or a value of zero. The database 600 can also include item data 136. The item data 136 is data describing an item. The item data 136 can include a size of an item, assigned display area of an item, price of an item, etc.

Figure 7:
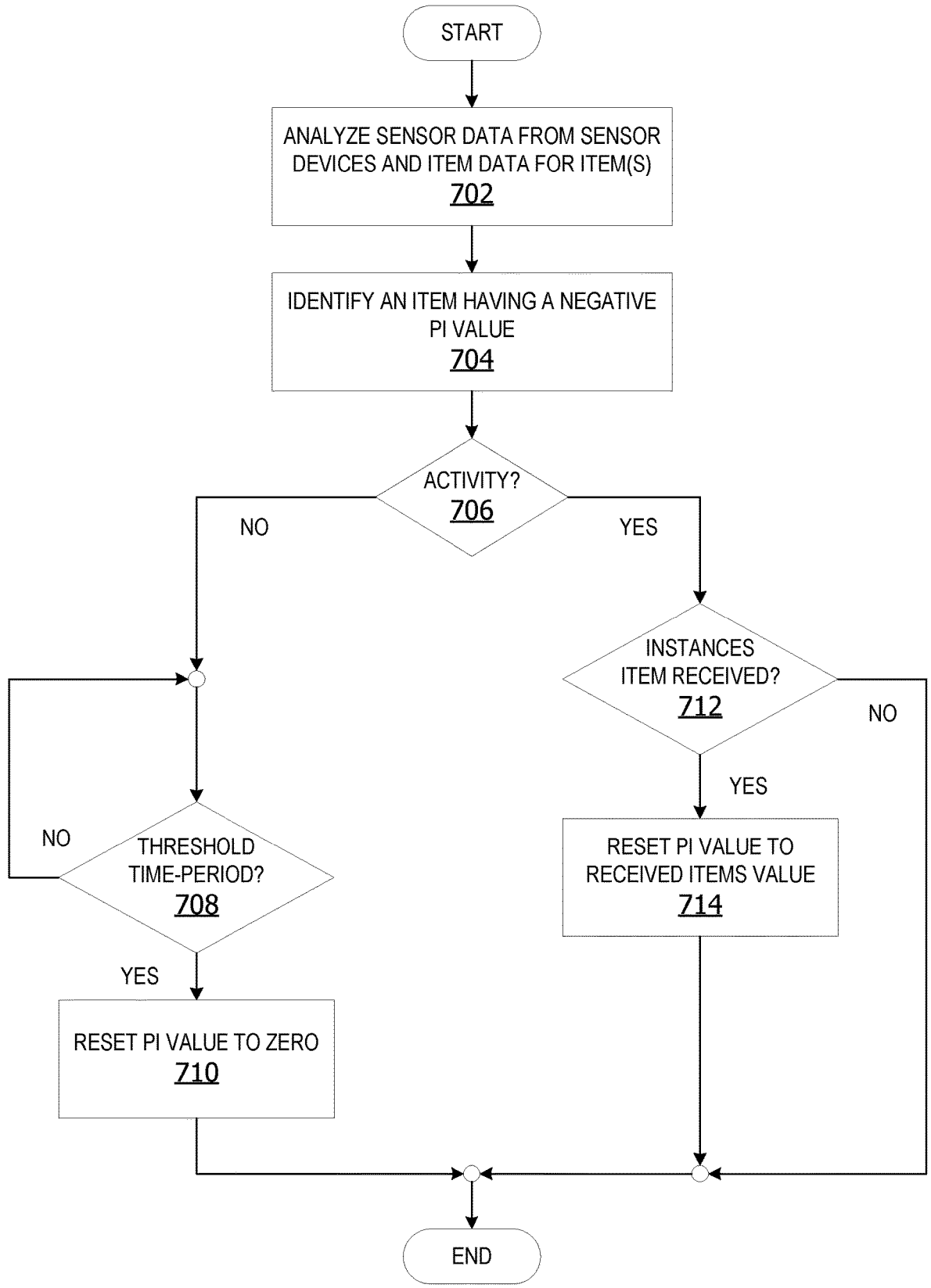
FIG. 7 is an exemplary flow chart illustrating operation of the computing device to re-set negative PI values.

FIG. 7 is an exemplary flow chart illustrating operation of the computing device to re-set negative PI values. The process shown in FIG. 7 can be performed by a negative PI resolution component, executing on a computing device, such as the computing device 102 or the user device 116 in FIG. 1.

The process begins by analyzing sensor data from sensor devices and item data for item(s) at 702. The sensor data is data generated by one or more sensor devices, such as the plurality of sensor devices 120 in FIG. 1 or the set of sensor devices 218 in FIG. 2. The item data is data associated with an item, such as, but not limited to, the item data 136 in FIG. 1, FIG. 4 and FIG. 6.

An item identification component 414 identifies an item having a negative PI value at 704. The item identification component is a component for analyzing aggregated data associated with one or more items to identify items having a negative PI, such as, but not limited to, the item identification component 414 in FIG. 4.

A negative reset component determines whether activity is associated with the identified item is detected at 706. The negative reset component is a component for resetting an understated PI value based on real-time data associated with the item, such as, but not limited to, the negative reset component 302 in FIG. 3. If no, the negative reset component determines whether the absence of activity occurred over a threshold time-period at 708. The threshold time-period is a threshold time range, such as, but not limited to, the threshold time-period 140 in FIG. 1 and FIG. 4. If yes, the negative reset component resets the PI value to zero at 710. The process terminates thereafter.

If activity is detected at 706, a receiving component determines whether one or more instances of the item is received at 712. The receiving component is a component for resolving negative PI based on item receiving data, such as, but not limited to, the receiving component 322 in FIG. 3 and/or FIG. 4. If no, the process terminates thereafter.

If instances of the item are received at 712, the receiving component resets the PI value to a received items value at 714. The process terminates thereafter.

While the operations illustrated in FIG. 7 are performed by a computing device, aspects of the disclosure contemplate performance of the operations by other entities. For example, a cloud service can perform one or more of the operations.

Figure 8:
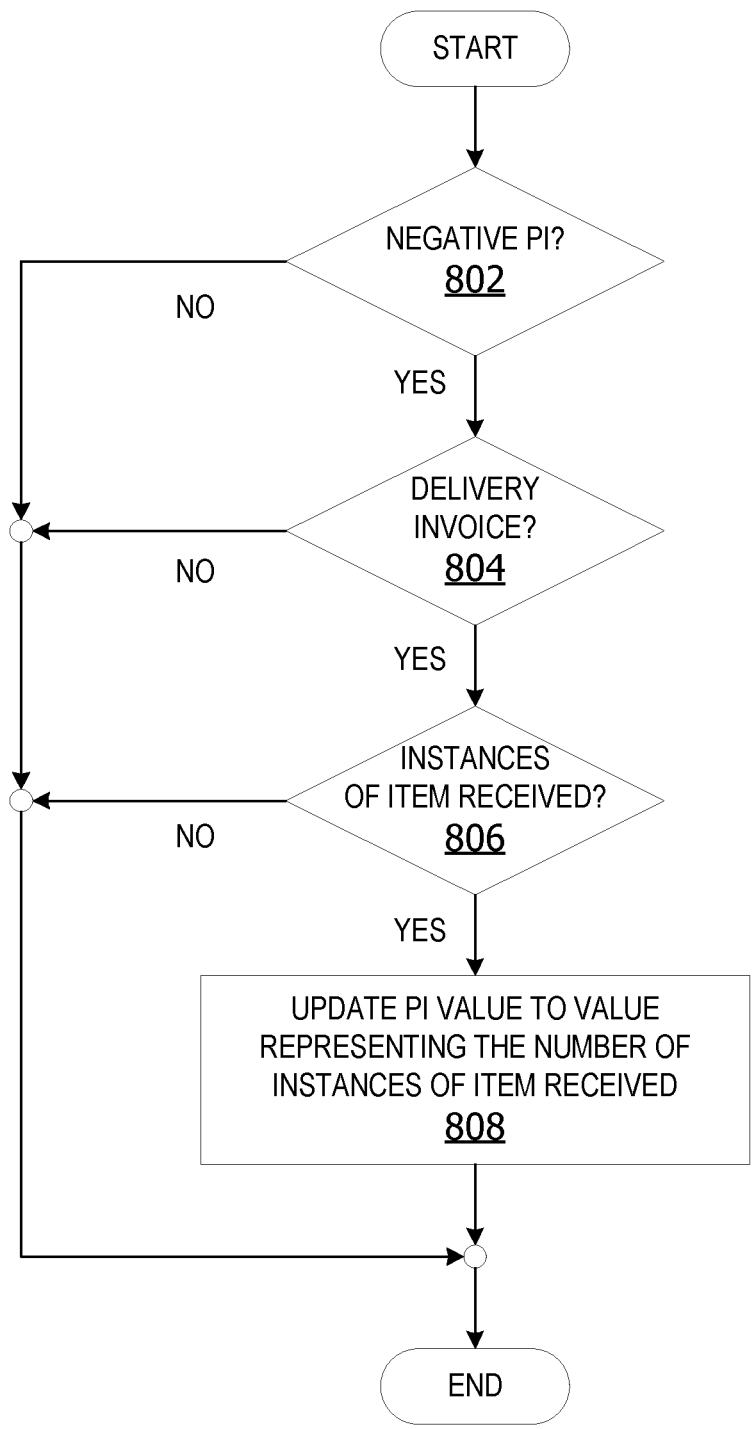
FIG. 8 is an exemplary flow chart illustrating operation of the computing device to update PI value based on instances of items received at an item selection area.

FIG. 8 is an exemplary flow chart illustrating operation of the computing device to update PI value based on instances of items received at an item selection area. The process shown in FIG. 8 can be performed by a negative PI resolution component, executing on a computing device, such as the computing device 102 or the user device 116 in FIG. 1.

The process begins by determining whether there is a negative PI associated with an item at 802. If no, the process terminates thereafter. If there is a negative PI, the negative PI resolution component determines if there is a delivery invoice indicating instances of the item received at 804. If no, the process terminates thereafter.

If there is a delivery invoice for the item, the negative PI resolution component determines if one or more instances of the item is received within the predetermined time-period at 806. If no, the process terminates thereafter.

If one or more instances of the item is received at 806, the negative PI resolution component updates the PI value to a value representing the number of instances of the item received at 808. The process terminates thereafter.

While the operations illustrated in FIG. 8 are performed by a computing device, aspects of the disclosure contemplate performance of the operations by other entities. For example, a cloud service can perform one or more of the operations.

Figure 9:
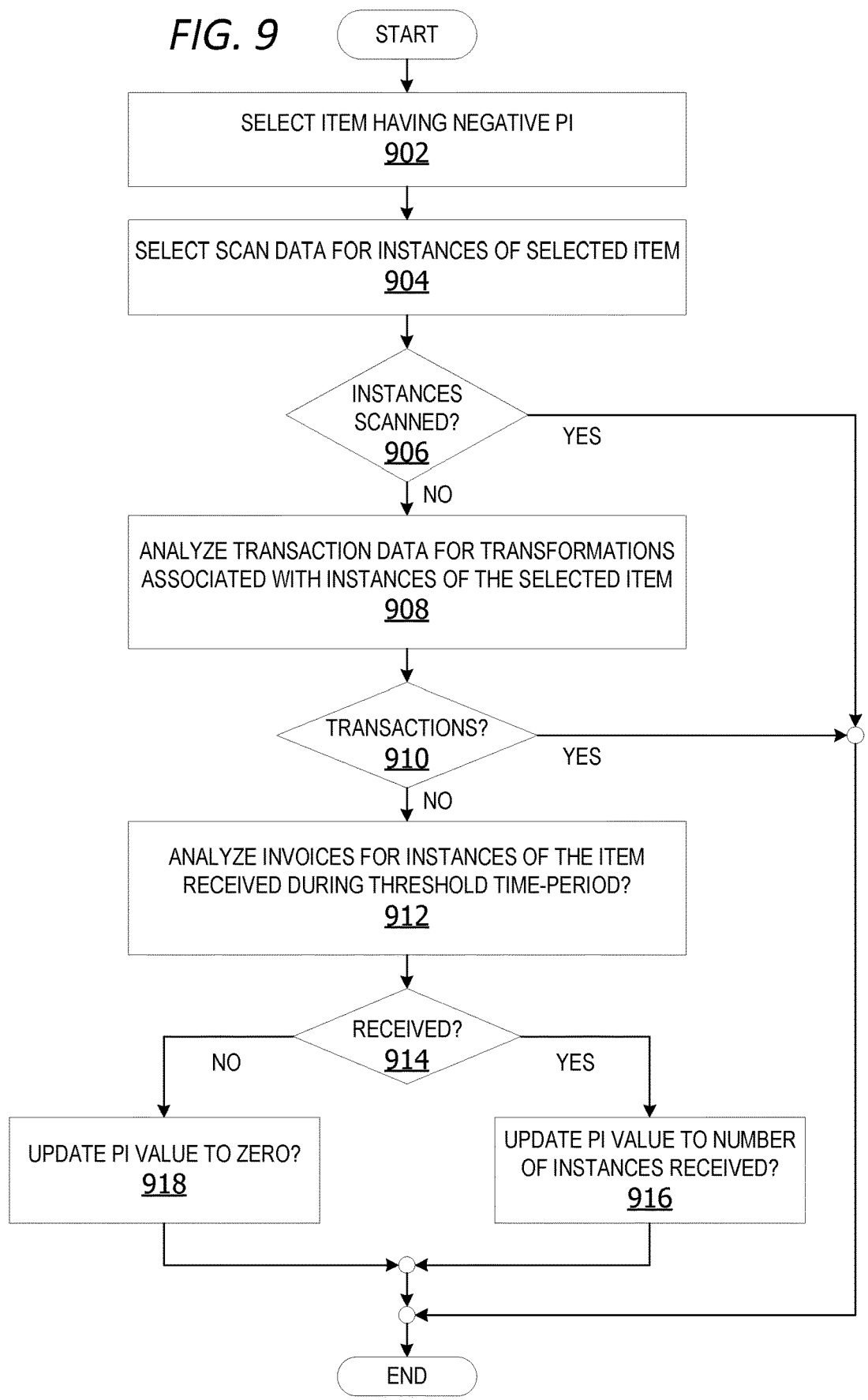
FIG. 9 is an exemplary flow chart illustrating operation of the computing device to re-set negative PI values for items having a negative activity level.

FIG. 9 is an exemplary flow chart illustrating operation of the computing device to re-set negative PI values for items having a negative activity level. The process shown in FIG. 9 can be performed by a negative PI resolution component, executing on a computing device, such as the computing device 102 or the user device 116 in FIG. 1.

The process begins by selecting an item having a negative PI at 902. An analysis component analyzes scan data for instances of the selected item at 904. The selected item is any type of item in inventory, such as, but not limited to, the selected item 312 in FIG. 3, FIG. 4 and/or FIG. 5. The scan data is data generated by at least one scan device, such as, but not limited to, the scan data 222 in FIG. 2 and FIG. 6. The analysis component is a component for analyzing data associated with items, such as the analysis component 452 in FIG. 4. If instances are scanned, the process terminates thereafter.

If no instances are scanned, the analysis component analyzes transaction data for transactions associated with instances of the selected item at 908. The transaction data is data associated with one or more previous transactions, such as, but not limited to, the transaction data 132 in FIG. 1, FIG. 2, FIG. 4 and/or FIG. 6. The analysis component determines if any transactions are detected at 910. If yes, the process terminates thereafter.

If there are no transactions associated with instances of the selected item, the analysis component analyzes invoices for instances of the item received during a threshold time-period at 912. The analysis component determines if any instances of the item are received at 914. If yes, a receiving component updates the PI value to the number of instances of the item received at 916. The process terminates thereafter.

If instances of the item are not received at 914, the negative reset component updates the PI value to zero at 918. The process terminates thereafter.

While the operations illustrated in FIG. 9 are performed by a computing device, aspects of the disclosure contemplate performance of the operations by other entities. For example, a cloud service can perform one or more of the operations.

FIG. 10 is an exemplary table 1000 illustrating items having negative PI during a one-week time-period. The first column 1002 is a total replenishable items having a negative PI across 4,500 stores during a seven-day time-span. In other words, the table 1000 represents changes in the number of items having a negative PI value on each day in a week, including a first day 1006, a second day 1008, a third day 1010, a fourth day 1012, a fifth day 1014, a sixth day 1016, and a seventh day 1018.

In this non-limiting example, the total store items having a negative PI across the 4,500 stores includes 440,000,000 items, with a 0.0007% of those items having a negative PI. The first column 1002 includes the number of negative PI value items occurring on each day. The total items having a negative PI at all the store locations is totaled at 1020. The average 1022 for each store is calculated by dividing the total 1020 by seven.

The second column 1026 is a total number of items having a PI value reset by the negative reset component in accordance with the negative reset rule for items having no net activity during the week. The number in each row is the number of items across all 4,500 stores that were changed (re-set). In other words, where the negative reset component updates/resolves the negative PI values, the second column shows how many fewer (less) items experience negative PI.

The last column 1028 shows the number of items having a PI value resolved under both the combined negative reset logic and the receiving logic. In other words, each row shows the number of fewer (less) items across all 4,500 stores having a negative (understated PI) because the negative reset component or the receiving component has resolved the negative PI via the negative reset and item receiving logic. In this non-limiting example, the value of 33,040.00 in the third column includes the 27,795.00 items for the second column 1026.

In this non-limiting example, the total number of items having a negative PI value resolved by the negative PI resolution component is 210,498.00 items out of the total 1020 number of 1,186,231.00 items having a negative PI. That is an overall reduction of 17.7% fewer negative PI items across the stores.

Additional Examples

In some examples, the system improves understated perpetual inventory automatically. The system converts a negative PI value for a selected item to a receiving value representing the number of units of the selected item received via at least one shipment upon arrival of the shipment at a store, distribution center or other retail location. If the PI for the selected item is negative and no additional units of the item are received via a shipment, the negative PI value is automatically reset to zero on condition no activity associated with any units of the selected item occurs for twenty-four hours. Activity associated with units of the selected item can include scanning a unit of the selected item, a transaction (purchase or return) of a unit of the selected item, or any other activity.

In an example scenario, if the PI value for a selected item is negative and a shipment arrives, the system does not net the PI because that would result in a continued understated PI for the item. Instead, the system resets the PI value to a value representing the number of instances of the selected item received (shipment quantity). If the PI is negative and there is no shipment including the selected item for three days, the system resets the PI value to zero. In another example, if there is a pending invoice including instances of the item which are in transit but has not yet arrived, the system does not update the PI value to the number of instances of the item while the invoice is pending. Instead, the system waits until arrival/delivery of the items to the store is confirmed (items received) prior to resetting the negative PI value to the shipment quantity. This reduces understated PI to improve truck-to-shelf inventory flow, lowering handling costs and reducing unproductive inventory.

In other examples, any negative PI values for items are reset daily in accordance with received items and/or activity (absence of items) associated with instances of the item because every day a negative PI value remains the more likely that erroneous value is likely to negatively influence item ordering, stocking, and other inventory-related procedures. This enables more accurate PI and timely resolution of negative PI issues.

In one example, if the PI value for an item is negative two (−2) on Tuesday and there is no activity associated with the item, the negative PI resolution component updates the PI value daily. In this example, the PI is re-set to zero the next day, on Wednesday. There is no activity associated with the item if there are no shipments (deliveries), no transactions, and no store PI changes (scan data) associated with the item.

If the PI value for an item is negative four (−4) and there is a pending invoice for twelve additional instances of the item to be received (in-transit), the system makes no changes to the PI value due to the un-finalized state of the invoice. When the twelve items are received, the system changes the PI value from negative four to twelve to reflect the twelve received instances of the item.

Alternatively, or in addition to the other examples described herein, examples include any combination of the following:

a database for storing data associated with at least one item;

an aggregation component, implemented on the at least one processor, that aggregates item data, transaction data, inventory data, delivery data, and the sensor data in the database;

the analysis component, implemented on the at least one processor, that analyzes the aggregated data using a set of reset rules;

an update hold component, implemented on the at least one processor, that prevents updating the first value until a pending invoice is finalized on condition an un-finalized invoice associated with at least one instance of the item is pending;

a verification component, implemented on the at least one processor, that analyzes the scan data using item data and planogram data associated with the item selection area to detect a presence of additional instances of the selected item within the item selection area, wherein the verification component verifies adjustment of the negative PI value on condition additional instances of the identified item are undetected;

wherein the plurality of sensor devices further comprises a set of image capture devices associated with the item selection area generating image data associated with at least a portion of at least one item in the plurality of items;

a verification component, implemented on the at least one processor, that analyzes the image data using item recognition analytics to detect a presence of additional instances of the selected item within the item selection area, wherein the verification component verifies resetting the negative PI value to the number of instances of the identified item received during the threshold time-period on condition additional instances of the identified item are undetected;

resetting a negative PI value associated with an item to zero on a daily basis in response to an absence of activity associated with at least one instance of the item occurring within a predetermined time-period, the activity comprising a sale of at least one instance of the item, scan data identifying at least one instance of the item physically present within the item selection area, or receipt of at least one instance of the item within the item selection area;

wherein the sensor data comprises image data generated by a set of image capture devices;

analyzing, by a verification component, the image data using item recognition analytics to detect a presence of any additional instances of the identified item within the item selection area, wherein the verification component verifies updating the negative PI value on condition additional instances of the identified item are undetected;

wherein the sensor data comprises scan data generated by a set of scanner devices;

analyzing, by a verification component, the scan data to detect a presence of any additional instances of the identified item within the item selection area, wherein the verification component verifies updating the negative PI value on condition additional instances of the identified item are undetected;

analyzing transaction data obtained from a set of POS devices associated with the item selection area;

determining whether at least one instance of the identified item is associated with a transaction during the predetermined time-period, wherein the negative PI value is reset on condition the transaction data indicates an absence of transactions associated with instances of the identified item during the threshold time-period;

resetting a negative PI value associated with an item to a value representing the number of instances of the item received at the item selection area during a predetermined time-period on condition a PI value for the item is a negative value and at least one instance of the item is received within the predetermined time-period;

a negative reset rule, wherein the negative reset rule specifies resetting a negative PI value associated with an item to zero on a daily basis on condition the negative reset component determines an absence of transactions associated with at least one instance of an item during a predetermined time-period, an absence of item scans associated with instances of the identified item during the predetermined time-period and an absence of instances of the item received at the item selection area within the predetermined time-period;

an item receiving rule, wherein the item receiving rule specifies resetting a negative PI value associated with an item to a value representing the number of instances of the item received at the item selection area during a predetermined time-period on condition a PI value for the item is a negative value and at least one instance of the item is received within the predetermined time-period;

wherein the plurality of sensor devices further comprises a set of image capture devices associated with the item selection area generating image data associated with the plurality of items;

a verification component, implemented on the at least one processor, that analyzes the image data using item recognition analytics to detect a presence of additional instances of the identified item within the item selection area, wherein the verification component verifies resetting the negative PI value to the number of instances of the identified item received during the threshold time-period on condition additional instances of the identified item are undetected;

the negative reset component, implemented on the at least one processor, that resets the negative PI value within the inventory record associated with the identified item to a value representing the number of instances of the identified item detected via the analysis of the image data;

wherein the plurality of sensor devices further comprises a set of scanner devices associated with the item selection area generating scan data associated with the plurality of items;

a verification component, implemented on the at least one processor, that analyzes the scan data using item data associated with the plurality of items to determine whether the scan data includes an identification of any additional instances of the identified item within the item selection area, wherein the verification component verifies resetting the negative PI value to the number of instances of the identified item received during the threshold time-period on condition the scan data excludes the identification of any additional instances of the identified item;

an update hold component, implemented on the at least one processor, that prevents updating the first value until a pending invoice is finalized on condition an un-finalized invoice associated with at least one instance of the item is pending;

a set of point-of-sale (POS) devices generating the transaction data associated with at least one item in the plurality of items;

the item identification component, implemented on the at least one processor, that analyzes the transaction data to determine whether at least one instance of the identified item is associated with a transaction during the threshold time-period, wherein the negative PI value is reset on condition the transaction data indicates an absence of transactions associated with instances of the identified item during the threshold time-period; and a receiving component, implemented on the at least one processor, that analyzes invoice data associated with a set of items received by the item selection area within the threshold time-period to determine a number of instances of the item received at the item selection area within the threshold time-period, wherein a negative PI value in the inventory record associated with the selected item is reset to a value representing the number of instances of the item received during the threshold time-period.

At least a portion of the functionality of the various elements in FIG. 1, FIG. 2, FIG. 3, FIG. 4, FIG. 5, and FIG. 6 can be performed by other elements in FIG. 1, FIG. 2, FIG. 3, FIG. 4, FIG. 5, and FIG. 6, or an entity (e.g., processor 106, web service, server, application program, computing device, etc.) not shown in FIG. 1, FIG. 2, FIG. 3, FIG. 4, FIG. 5, and FIG. 6.

In some examples, the operations illustrated in FIG. 7, FIG. 8 and FIG. 9 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for negative PI resolution. For example, the elements illustrated in FIG. 1, FIG. 2, FIG. 3, FIG. 4, FIG. 5, and FIG. 6, such as when encoded to perform the operations illustrated in FIG. 7, FIG. 8 and FIG. 9, constitute exemplary means for analyzing sensor data obtained from a plurality of sensor devices associated with an item selection area and item data associated with a plurality of items in inventory of the item selection area using a set of reset rules; exemplary means for identifying an item in the plurality of items having a negative PI value and an absence of activity for a threshold time-period based on the analysis; exemplary means for updating the negative PI value within an inventory record associated with the identified item to zero on condition the identified item has the negative PI value and the absence of activity for the threshold time-period; and exemplary means for updating the negative PI value to a positive value representing a number of instances of the identified item received by the item selection area during the threshold time-period on condition a set of items including at least one instance of the identified item is unreceived at the item selection area during the threshold time-period.

Other non-limiting examples provide one or more computer storage devices having a first computer-executable instructions stored thereon for providing for resolution of negative IP associated with an item. When executed by a computer, the computer performs operations including analyzing sensor data obtained from a plurality of sensor devices associated with an item selection area and item data associated with a plurality of items in inventory of the item selection area using a set of reset rules; identifying an item in the plurality of items having a negative PI value and an absence of activity for a threshold time-period based on the analysis; updating the negative PI value within an inventory record associated with the identified item to zero on condition the identified item has the negative PI value and the absence of activity for the threshold time-period; and updating the negative PI value to a positive value representing a number of instances of the identified item received by the item selection area during the threshold time-period on condition a set of items including at least one instance of the identified item is unreceived at the item selection area during the threshold time-period.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for dynamic negative perpetual inventory (PI) adjustment, the system comprising:
   a memory;
   at least one processor communicatively coupled to the memory;

a data storage device storing inventory data associated with a plurality of items in an inventory associated with an item selection area;

a plurality of sensor devices associated with the item selection area, the plurality of sensor devices generating sensor data associated with at least one item physically located within the item selection area, including item scan data associated with the at least one item;

a receiving component, implemented on the at least one processor, analyzes invoice data associated with a set of items received by the item selection area within a threshold time-period to determine a number of instances of the item received at the item selection area within the threshold time-period;

an item identification component, implemented on the at least one processor, analyzes the sensor data, the inventory data, and transaction data associated with the plurality of items using a set of reset rules;

the item identification component identifies an item in the plurality of items having a negative PI value and an absence of activity for the threshold time-period based on the analysis, the activity comprising at least one of a transaction associated with at least one instance of the item, a receipt of the scan data identifying least one instance of the item within the item selection area from at least one scan device, or identification of at least one instance of the item received at the item selection area within a predetermined time-period based on the invoice data, wherein the negative PI value is a value indicating less than zero instances of the identified item in inventory;

a negative reset component, implemented on the at least one processor, resets a first value in an inventory record associated with the identified item to zero on condition the first value is the negative PI value and the absence of activity associated with at least one instance of the item occurs within the predetermined time-period; and the receiving component, implemented on the at least one processor, resets the first value associated with the identified item to a second value representing the number of instances of the item received at the item selection area during the predetermined time-period on condition a PI value for the item is a negative value and delivery data identifying at least one instance of the item received at the item selection area is received within the predetermined time-period.

2. The system of claim 1, further comprising:
a database for storing data associated with at least one item;
an aggregation component, implemented on the at least one processor, that aggregates item data, transaction data, the inventory data, the delivery data, and the sensor data in the database; and
the analysis component, implemented on the at least one processor, that analyzes aggregated data using the set of reset rules.

3. The system of claim 1, further comprising:
an update hold component, implemented on the at least one processor, that prevents updating the first value until a pending invoice is finalized on condition an un-finalized invoice associated with at least one instance of the item is pending.

4. The system of claim 1, further comprising:
a verification component, implemented on the at least one processor, that analyzes the scan data using item data and planogram data associated with the item selection area to detect a presence of additional instances of the identified item within the item selection area, wherein the verification component verifies adjustment of the negative PI value on condition additional instances of the identified item are undetected.

5. The system of claim 1, wherein the plurality of sensor devices further comprises a set of image capture devices associated with the item selection area generating image data associated with at least a portion of at least one item in the plurality of items, and further comprising:
a verification component, implemented on the at least one processor, that analyzes the image data using item recognition analytics to detect a presence of additional instances of the identified item within the item selection area, wherein the verification component verifies resetting the negative PI value to the number of instances of the identified item received during the threshold time-period on condition additional instances of the identified item are undetected.

6. A computer-implemented method for dynamic negative perpetual inventory adjustment, the computer-implemented method comprising:
analyzing, by an item identification component, sensor data obtained from a plurality of sensor devices associated with an item selection area and item data associated with a plurality of items in inventory of the item selection area using a set of reset rules;
identifying, by the item identification component, an item in the plurality of items having a negative PI value and an absence of activity for a threshold time-period based on the analysis, wherein the negative PI value is a value indicating less than zero instances of the identified item in inventory;
updating, by a negative reset component, the negative PI value within an inventory record associated with the identified item to zero on condition the identified item has the negative PI value and the absence of activity for the threshold time-period; and
updating, by a receiving component, the negative PI value to a positive value representing a number of instances of the identified item received by the item selection area during the threshold time-period on condition a set of items including at least one instance of the identified item is unreceived at the item selection area during the threshold time-period.

7. The computer-implemented method of claim 6, further comprising:
resetting a negative PI value associated with an item to zero on a daily basis in response to an absence of activity associated with at least one instance of the item occurring within a predetermined time-period, the activity comprising a sale of at least one instance of the item, scan data identifying at least one instance of the item physically present within the item selection area, or receipt of at least one instance of the item within the item selection area.

8. The computer-implemented method of claim 6, wherein the sensor data comprises image data generated by a set of image capture devices, and further comprising:
analyzing, by a verification component, the image data using item recognition analytics to detect a presence of any additional instances of the identified item within the item selection area, wherein the verification component verifies updating the negative PI value on condition additional instances of the identified item are undetected.

9. The computer-implemented method of claim 6, wherein the sensor data comprises scan data generated by a set of scanner devices, and further comprising:
   analyzing, by a verification component, the scan data to detect a presence of any additional instances of the identified item within the item selection area, wherein the verification component verifies updating the negative PI value on condition additional instances of the identified item are undetected.

10. The computer-implemented method of claim 6, further comprising:
   analyzing transaction data obtained from a set of POS devices associated with the item selection area; and determining whether at least one instance of the identified item is associated with a transaction during a predetermined time-period, wherein the negative PI value is reset on condition the transaction data indicates an absence of transactions associated with instances of the identified item during the threshold time-period.

11. The computer-implemented method of claim 6, further comprising:
   resetting a negative PI value associated with an item to a value representing the number of instances of the item received at the item selection area during a predetermined time-period on condition a PI value for the item is a negative value and at least one instance of the item is received within the predetermined time-period.

12. A system for dynamic perpetual inventory (PI) adjustment, the system comprising:
   a memory;
   at least one processor communicatively coupled to the memory;
   a set if scanner devices generating scan data associated with a set of items in an item selection area;
   an item identification component, implemented on the at least one processor, analyzes the scan data, inventory data, and transaction data associated with a plurality of items in inventory of the item selection area using a set of reset rules;
   the item identification component identifies an item in the plurality of items having a negative PI value and an absence of activity for a threshold time-period based on the analysis, wherein the negative PI value is a value indicating less than zero instances of the identified item in inventory;
   a receiving component, implemented on the at least one processor, analyzes invoice data associated with a set of items received by the item selection area within the threshold time-period to determine a number of instances of the item received at the item selection area within the threshold time-period;
   the receiving component, implemented on the at least one processor, resets the negative PI value within an inventory record associated with the identified item to a value representing the number of instances of the identified item received by the item selection area within the threshold time-period; and
   a negative reset component, implemented on the at least one processor, resets the negative PI value to zero on condition the number of instances of the identified item received by the item selection area within the threshold time-period is zero.

13. The system of claim 12, wherein the set of reset rules further comprises:
   a negative reset rule, wherein the negative reset rule specifies resetting a negative PI value associated with an item to zero on a daily basis on condition the negative reset component determines an absence of transactions associated with at least one instance of an item during a predetermined time-period, an absence of item scans associated with instances of the identified item during the predetermined time-period and an absence of instances of the item received at the item selection area within the predetermined time-period.

14. The system of claim 12, wherein the set of reset rules further comprises:
   an item receiving rule, wherein the item receiving rule specifies resetting a negative PI value associated with an item to a value representing the number of instances of the item received at the item selection area during a predetermined time-period on condition a PI value for the item is a negative value and at least one instance of the item is received within the predetermined time-period.

15. The system of claim 12, further comprising:
   a set of image capture devices associated with the item selection area generating image data associated with the plurality of items; and
   a verification component, implemented on the at least one processor, that analyzes the image data using item recognition analytics to detect a presence of additional instances of the identified item within the item selection area, wherein the verification component verifies resetting the negative PI value to the number of instances of the identified item received during the threshold time-period on condition additional instances of the identified item are undetected.

16. The system of claim 12, further comprising:
   the negative reset component, implemented on the at least one processor, that resets the negative PI value within the inventory record associated with the identified item to a value representing the number of instances of the identified item detected via the analysis of image data.

17. The system of claim 12, further comprising:
   a verification component, implemented on the at least one processor, that analyzes the scan data using item data associated with the plurality of items to determine whether the scan data includes an identification of any additional instances of the identified item within the item selection area, wherein the verification component verifies resetting the negative PI value to the number of instances of the identified item received during the threshold time-period on condition the scan data excludes the identification of any additional instances of the identified item.

18. The system of claim 12, further comprising:
   an update hold component, implemented on the at least one processor, that prevents updating the negative PI value until a pending invoice is finalized on condition an un-finalized invoice associated with at least one instance of the item is pending.

19. The system of claim 12, further comprising:
   a set of point-of-sale (POS) devices generating the transaction data associated with at least one item in the plurality of items; and
   the item identification component, implemented on the at least one processor, that analyzes the transaction data to determine whether at least one instance of the identified item is associated with a transaction during the threshold time-period, wherein the negative PI value is reset on condition the transaction data indicates an absence of transactions associated with instances of the identified item during the threshold time-period.

20. The system of claim 12, further comprising:
the receiving component, implemented on the at least one processor, that analyzes invoice data associated with a set of items received by the item selection area within the threshold time-period to determine the number of instances of the item received at the item selection area within the threshold time-period, wherein a negative PI value in the inventory record associated with the identified item is reset to a value representing the number of instances of the item received during the threshold time-period.

* * * * *